No. 789,460. PATENTED MAY 9, 1905.
W. R. SMITH.
EYEGLASSES, &c.
APPLICATION FILED DEC. 1, 1904.
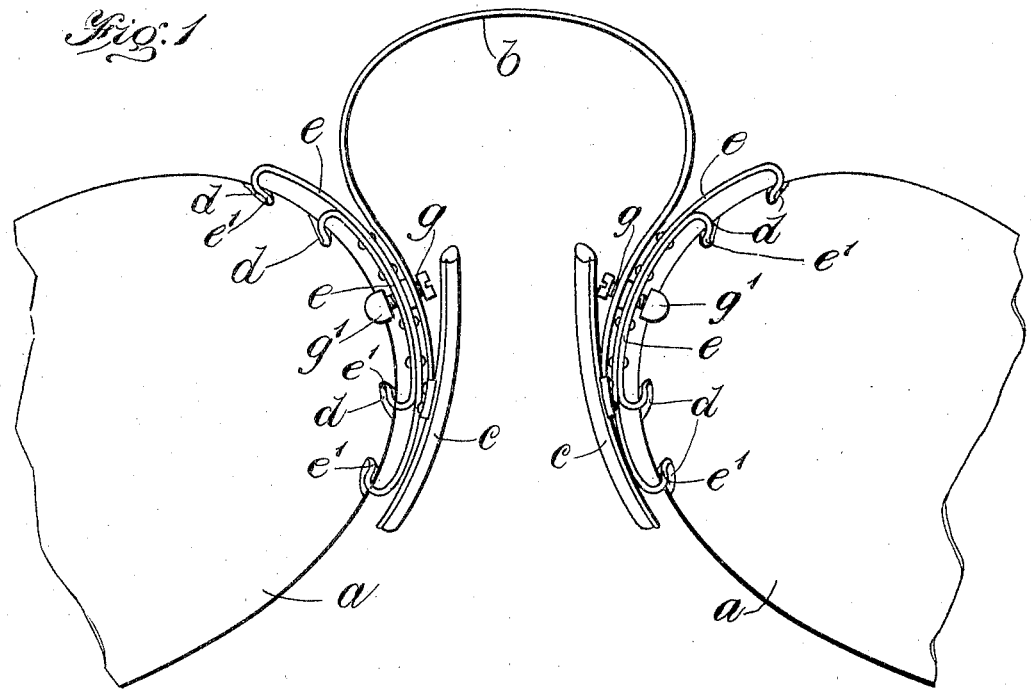
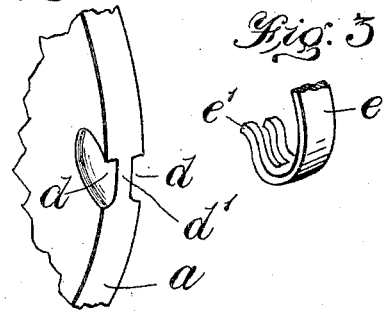
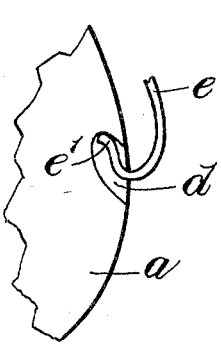
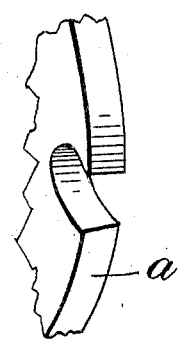
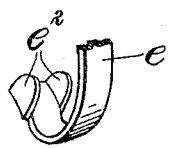

No. 789,460.

Patented May 9, 1905.

UNITED STATES PATENT OFFICE.

WILLIAM R. SMITH, OF BUFFALO, NEW YORK.

EYEGLASSES, &c.

SPECIFICATION forming part of Letters Patent No. 789,460, dated May 9, 1905.

Application filed December 1, 1904. Serial No. 234,979.

*To all whom it may concern:*

Be it known that I, WILLIAM R. SMITH, of Buffalo, in the county of Erie and State of New York, have invented certain new and useful Improvements in Eyeglasses, &c., of which the following is a specification.

This invention relates to rimless lenses for eyeglasses, &c.; and it has for its object to provide improved means for securing to the lenses the bow or nose-piece which connects the lenses in such manner as to reduce to the minimum the liability of breakage of the lenses at the points where they are attached to the connecting means.

The invention consists in the improvements which I will now proceed to describe and claim.

Of the accompanying drawings, forming a part of this specification, Figure 1 represents a side elevation of a pair of eyeglasses embodying my invention. Figs. 2 and 3 represent fragmentary perspective views of parts shown in Fig. 1. Fig. 4 represents a fragmentary view showing an enlargement of a portion of Fig. 1. Figs. 5 and 6 are fragmentary perspective views showing a different embodiment of my invention. Fig. 7 represents a side view showing the embodiment represented in Figs. 5 and 6, the parts being connected.

The same reference characters indicate the same parts in all the figures.

In the drawings, *a a* represent the lenses of a pair of rimless eyeglasses, *b* represents the usual bow or spring which connects the lenses, and *c c* represent the usual clamps secured to the bow and adapted to bear on the sides of the wearer's nose. The perimeter of each lens is provided with oppositely-arranged notches *d d*, each notch having an open end on the perimeter of the lens. The open end of one notch faces in an opposite direction from the open end of the other notch, or, in other words, the two notches are oppositely arranged, as above stated. In the embodiment of my invention shown in Figs. 1, 2, 3, and 4 each notch is composed of two parts separated by a wall *d'*, as shown in Fig. 2.

*e* represents a strip of resilient metal having hooked ends *e'* formed to engage the notches *d*. When the notches are formed as shown in Figs. 1, 2, and 4, the hooked ends of the strip *e* are bifurcated, as shown in Fig. 3, the arms or bifurcations of the hooked ends bestriding the wall *d'*. The hooked ends *e'* extend in opposite directions, as shown in Fig. 1.

*g* represents a tightening device which is adjustably engaged with the central portion of the strip *e* and bears on the perimeter of the lens between the notches *d d*, said device being preferably a screw the thread of which is engaged with an internally-threaded aperture in the strip *e*. The function of the adjusting device *g* is to draw the inner sides of the hooked ends *e'* firmly against the corresponding sides of the grooves *d*. This is effected by turning the screw inwardly to force the central portion of the strip *e* away from the perimeter of the lens. It will be seen that when the tightening device *g* has been adjusted in the manner described the hooked ends of the strip are pressed closely against the corresponding sides of the notches and are thus firmly engaged with the lens.

In the construction shown in Figs. 1, 2, 3, and 4 edgewise displacement of the strip *e* relatively to the lens is prevented by the bifurcation of the hooked ends of the strip and the wall *d'* between the parts of the notches.

In Figs. 5, 6, and 7 I show the notch extending entirely across the lens, the hooked end of the strip being provided with ears $e^2$ $e^2$, adapted to bear on opposite sides of the lens.

For the sake of greater firmness and security of engagement I provide a plurality of sets of notches in the lens and a corresponding plurality of strips *e*, engaged, as above described, with said notches, the tightening device *g* being engaged with all of the strips *e*.

The screw *g* is utilized to connect the strip or strips *e* with the bow or spring *b*, as shown in Fig. 1. The screw *g* may bear on a step or shoe *g'*, interposed between its inner end and the edge of the lens, said shoe preventing liability of injury to the lens by the screw.

I claim—

1. A lens having oppositely-arranged notches in its perimeter, a resilient metal strip having hooked ends adapted to enter said notches, and a tightening device adjustably engaged with the central portion of the strip and bearing against the perimeter of the lens.

2. A lens having a plurality of sets of notches in its perimeter, the notches of each set being oppositely arranged, a plurality of resilient metal strips having hooked ends adapted to enter said notches, and a tightening-screw engaged with the central portions of said strips and bearing against the perimeter of the lens.

In testimony whereof I have affixed my signature in presence of two witnesses.

WILLIAM R. SMITH.

Witnesses:
C. F. BROWN,
E. BATCHELDER.